United States Patent [19]

Watanabe et al.

[11] Patent Number: 4,950,168

[45] Date of Patent: Aug. 21, 1990

[54] ELECTRICAL CONNECTION BOX

[75] Inventors: Mitsugu Watanabe; Keiichi Ozaki, both of Shizuoka, Japan

[73] Assignee: Yazaki Corporation, Tokyo, Japan

[21] Appl. No.: 338,086

[22] Filed: Apr. 14, 1989

[30] Foreign Application Priority Data

Apr. 14, 1988 [JP] Japan ................... 63-90250

[51] Int. Cl.⁵ .......................................... H01R 13/518
[52] U.S. Cl. ..................................... 439/34; 439/638; 439/707
[58] Field of Search ................. 439/34, 540, 638–640, 439/404, 405, 502, 505, 707

[56] References Cited

U.S. PATENT DOCUMENTS

| | | | |
|---|---|---|---|
| 3,731,254 | 5/1973 | Key | 439/502 |
| 4,040,709 | 8/1977 | Dola et al. | 439/638 |
| 4,162,815 | 7/1979 | Fleischhacker | 439/502 |
| 4,245,880 | 1/1981 | Zimmerman, Jr. et al. | 439/405 |
| 4,508,399 | 4/1985 | Dowling et al. | 439/404 |

FOREIGN PATENT DOCUMENTS

| | | | |
|---|---|---|---|
| 2161034 | 1/1986 | United Kingdom | 439/404 |
| 2166603 | 5/1986 | United Kingdom | 439/34 |

Primary Examiner—Gary F. Paumen
Attorney, Agent, or Firm—Sughrue, Mion, Zinn, Macpeak & Seas

[57] ABSTRACT

The circuits contained in an electrical connection box provided near an instrument panel of a car can be separated into a plurality of separately formed connection blocks. The connection blocks each have terminals in which a plurality of conductors are press-fitted so that the connection blocks are electrically connected through the conductors and the terminals. The relative positions of the connection blocks are then adjusted so that the shapes of the connection blocks and conductors conform to the shape of the instrument panel. Thus, the connection box is close to the objects with which it is to be connected, the capacity of accommodating more fuses, circuits, etc., is increased, and electrical wires are shortened. Additionally, it is easy to adjust the connection box for various types of cars and specifications.

10 Claims, 8 Drawing Sheets

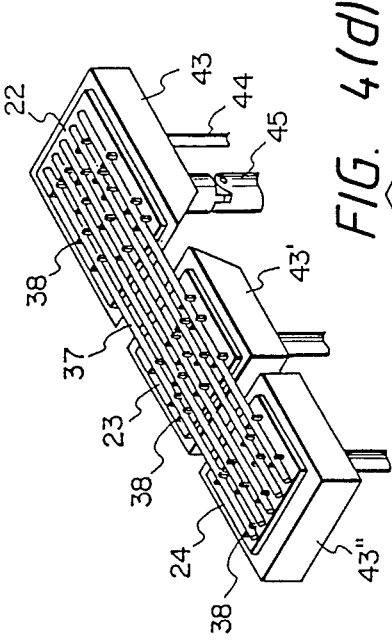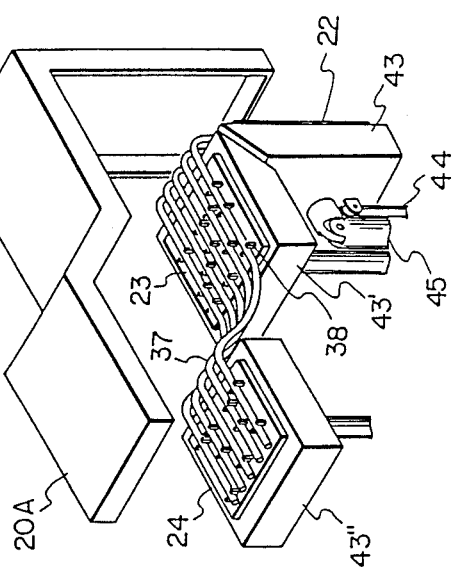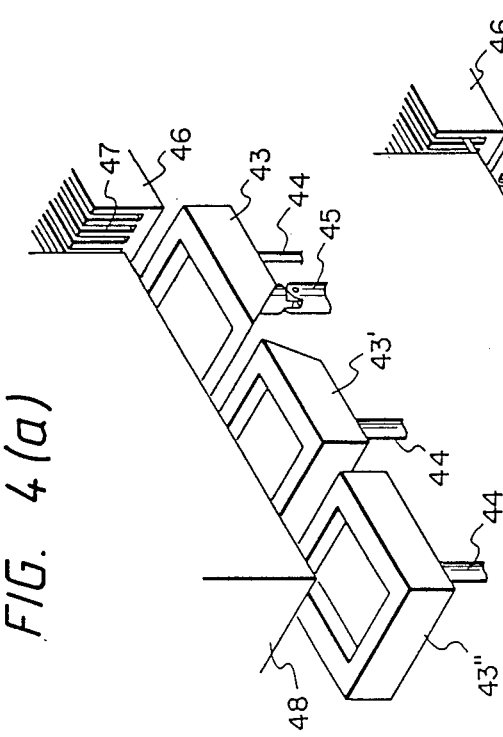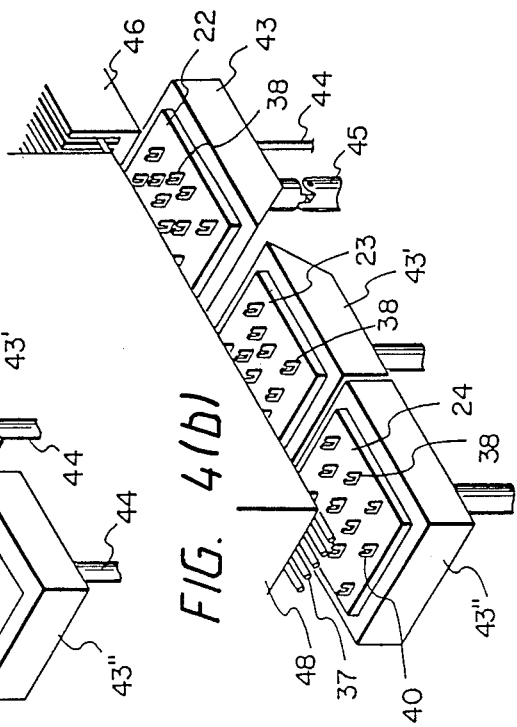

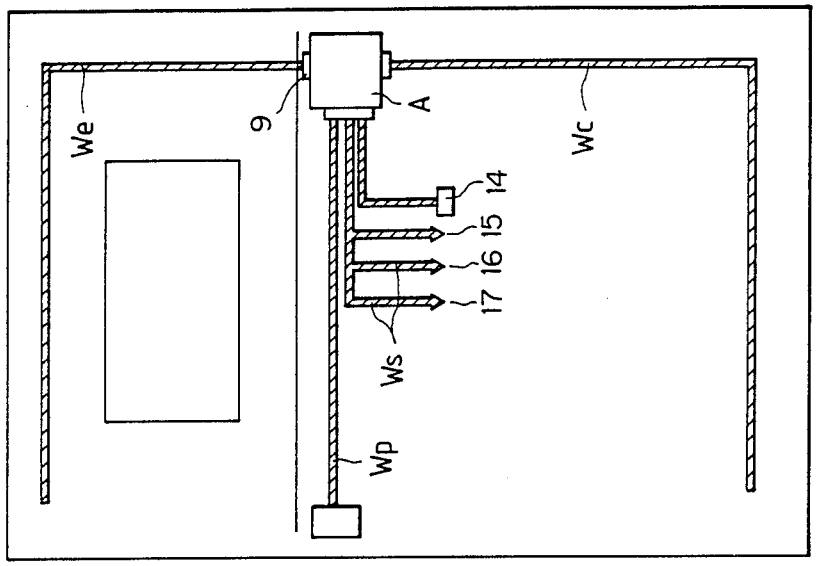
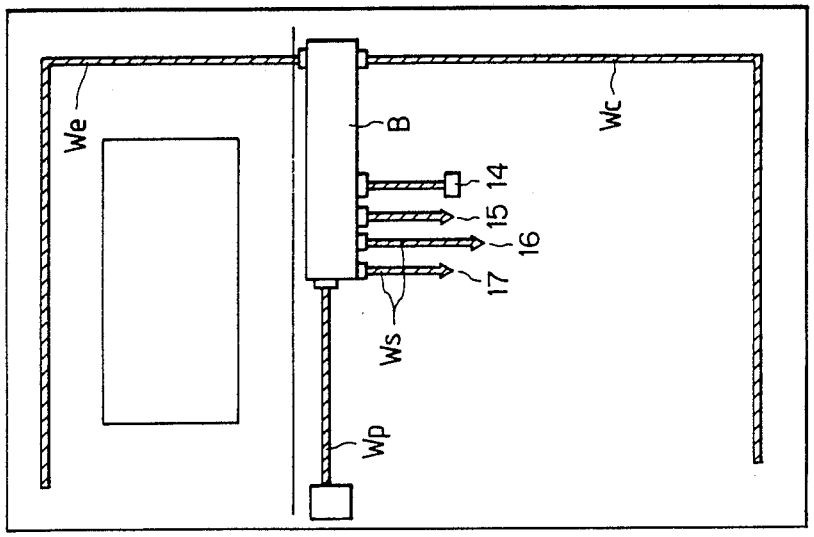

ELECTRICAL CONNECTION BOX

BACKGROUND OF THE INVENTION

The present invention relates to an electrical connection box used for wiring a car or the like and a method of producing the electrical connection box.

An electrical connection box of this kind generally has a structure in which circuits including a number of branch connection portions of a wire harness are incorporated and a number of relays and fuses are provided collectively.

FIG. 8 shows an example of an electrical connection box, in which wiring-plate assemblies a, b, c ... each having an insulating plate 3 and a plurality of bus bars 4 are laminated in order and housed within a main casing 1 and a lower casing 2. Tab terminals 5 which branch from each of the bus bars 4 and project upward or downward are inserted into connection portions such as connector housings 9, fuse cavities 10, or the like, through holes 6 formed in the insulating plates 3, and are connected to a terminal connector 9 of a wire harness W, blade-type fuses 11, relays 12, circuit breakers 13, and the like. Relay terminals 8, each having female terminal portions 7 at its opposite ends, are interposed between the fuses 11, etc. and tab terminals 5, if necessary.

As shown in FIG. 9, conventionally, an electrical connection box A, as described above, is provided on a cowl side C in the vicinity of a meter board M of an instrument panel P. As shown FIGS. 10 and 7b, the electrical connection box A is connected to an engine-side harness We, a panel-side harness Wp a cowl side harness Wc etc., through the connector housing 9, and further connected to an ignition switch SW 14, a group of meters 15, switches 16 and accessories 17 such as a radio or a cigar lighter on the instrument panel P through a plurality of sub-harnesses Ws.

The space for mounting this conventional electrical connection box A is limited to the cowl side, and the internal circuit of the electrical connection box A has a structure of lamination of the wiring-plate assemblies a, b, ... (FIG. 8). Accordingly, various problems occur as follows.

(1) The mounting space at the cowl side portion is too small to sufficiently provide the capacity for housing the electrical connection box, and it is therefore impossible to house necessary joints (branch connections), relays, fuses, etc.

(2) Accordingly, the number of joints between electrical wires is increased, so that the electrical connection box becomes large.

(3) The electrical connection box attaching position is a separated distance from objects to be connected such as the ignition switch SW 14, the meters 15, etc., as shown in FIG. 7b so that the number of the going and returning circuits (sub-harnesses Ws) is too large to thereby make the wire harness. resulting in a complicated configuration.

(4) If the internal structure of the electrical connection box is partially changed depending on the kind, grade, or the like of a car, it becomes necessary to produce the entire electrical connection box again so that the cost rises.

SUMMARY OF THE INVENTION

The present invention has been achieved in the aforementioned circumstances and an object thereof is to provide an electrical connection box which can be disposed closely adjacent to the objects to be connected to the connection box by use of an empty space on the wall surface of a structure, such as an instrument panel or dashboard of a car, so that the capacity for accommodating fuses, relays, circuits, etc. is increased, the number of joints is reduced, and the electrical wires are shortened. This makes the wire harness small in size, and it is easy to adjust for the kind, variations in grade, or the like, of a car Another object of the invention is to provide a method of producing such an electrical connection box.

In order to attain the above objects, the electrical connection box according to the present invention, is characterized in that an electrical connection box housing necessary circuits therein is divided into several connection blocks positioned along a wall surface of an instrument panel of a car. A plurality of conductors are provided on the connection blocks so that the connection blocks are electrically connected to each other through the conductors.

Alternatively, the connection blocks may be housed in a housing body previously formed along a wall surface of a structure such as an instrument panel instead of forming the divisional blocks along the wall surface of the structure.

The production of such electrical connection boxes is attained by the method comprising the steps of: dividing an electrical connection box housing necessary circuits into several connection blocks: setting the divided connection blocks linearly at suitable intervals; providing a plurality of conductors over the connection blocks; connecting the conductors to the circuits at desired positions moving the connection blocks electrically connected to the conductors along a wall surface of a structure such as an instrument panel of a car or the like; and positioning and fixing the connection blocks with covers.

BRIEF DESCRIPTION OF THE DRAWINGS

Other features and advantages of the present invention will be apparent from the following description taken in connection with the following drawings, wherein:

FIGS. 4a–4d are perspective views illustrating the process of producing the electrical connection box according to the present invention;

FIGS. 7a and 7b are views for explaining the arrangement of wire harnesses in the cases where the electrical connection box according to the present invention and a conventional electrical connection box are used, respectively;

DETAILED DESCRIPTION OF THE PREFERRED EMBODIMENTS

Figure 1:
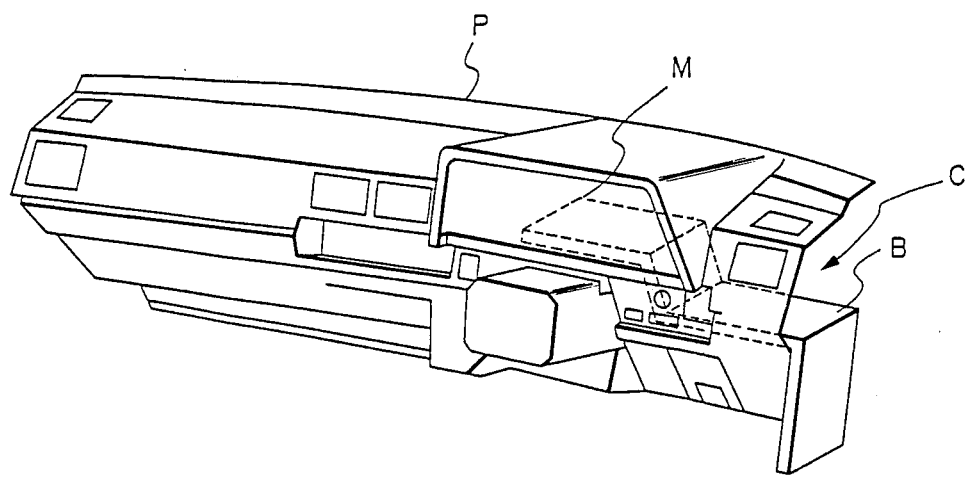
FIG. 1 is a perspective view for explaining the assembled condition of the electrical connection box according to the present invention.

In FIG. 1, reference symbol B designates the electrical connection box according to the present invention, which is disposed over a portion from a lower surface of a meter board M of an instrument panel P to a cowl side C on the driver's seat side.

Figure 2:
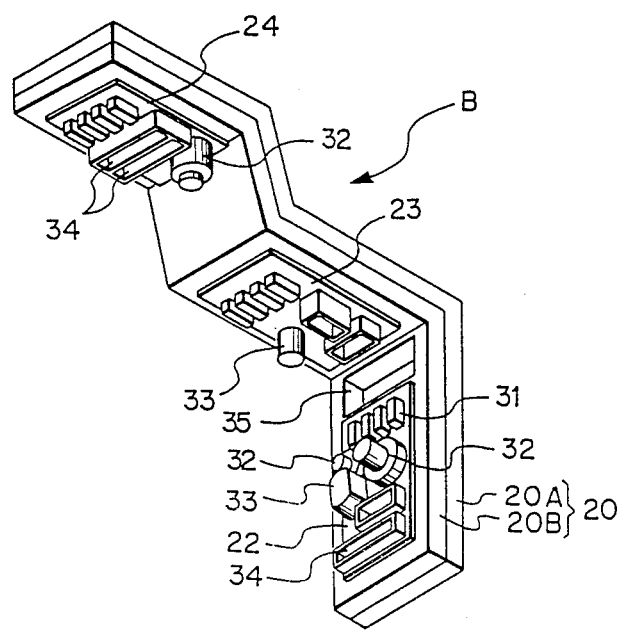
FIG. 2 is an enlarged perspective view of the electrical connection box according to the present invention.

FIG. 2 is an enlarged perspective view of electrical connection box B. Electrical connection box B is arranged so that three-divisional connection blocks 22, 23 and 24 are housed in a housing body 20 constituted by an upper cover 20A and a lower cover 20B.

The upper and lower covers of the housing body 20 are formed through plastic molding to have a three-dimensional structure along a spatial shape which extends from the lower surface of the meter board M to the cowl side C. The connection blocks 22-24 are fixedly positioned in a plurality of window portions 21 opened in the lower cover 20B.

Figure 3:
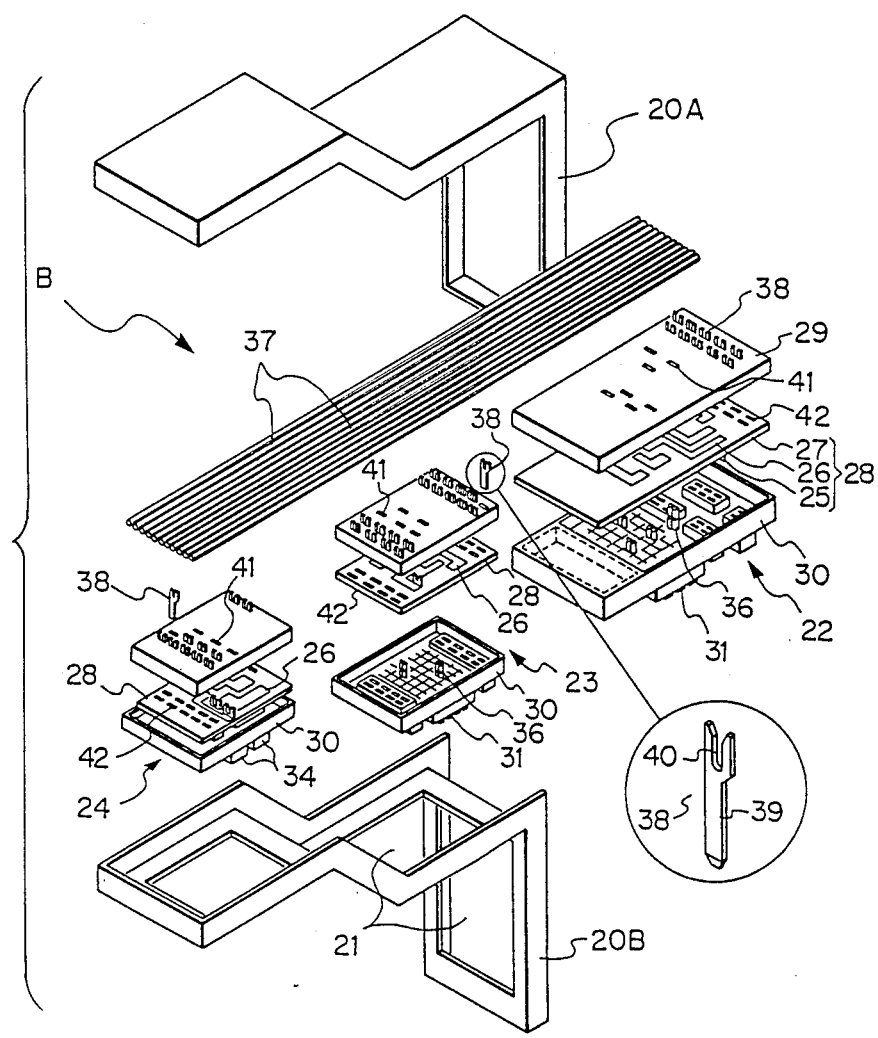
FIG. 3 is an exploded perspective view of the electrical connection box according to the present invention.
Figure 5:
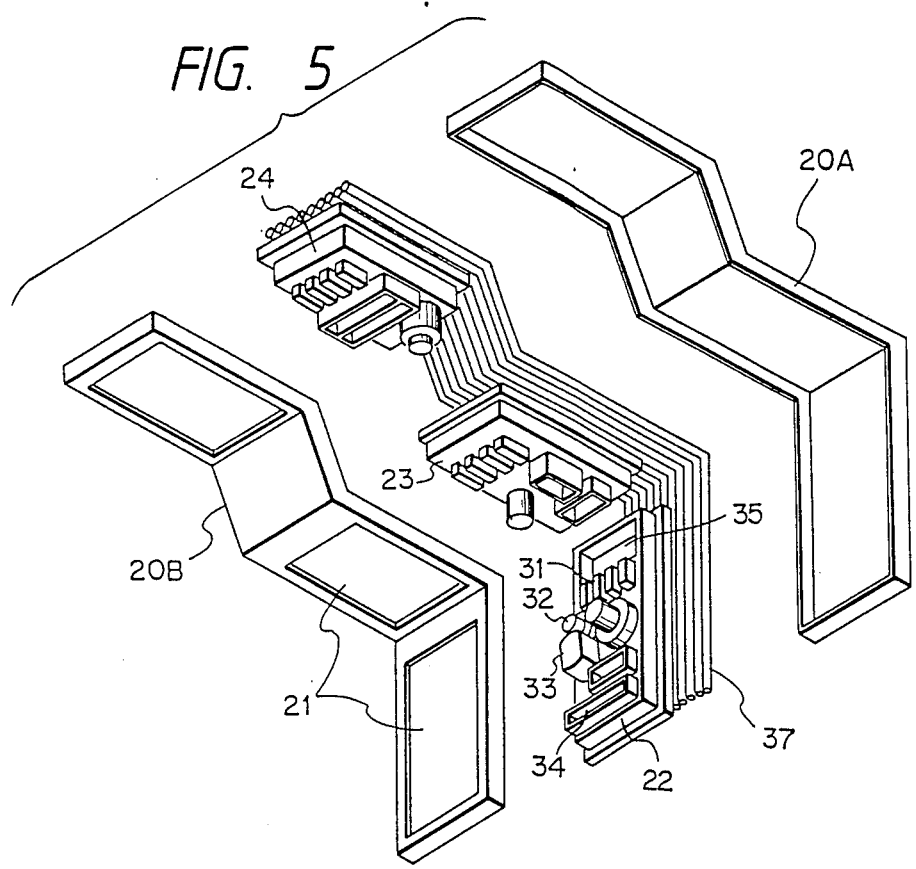
FIG. 5 is a perspective view showing the state just before completion of the assembling of the electrical connection box according to the present invention.
Figure 9:
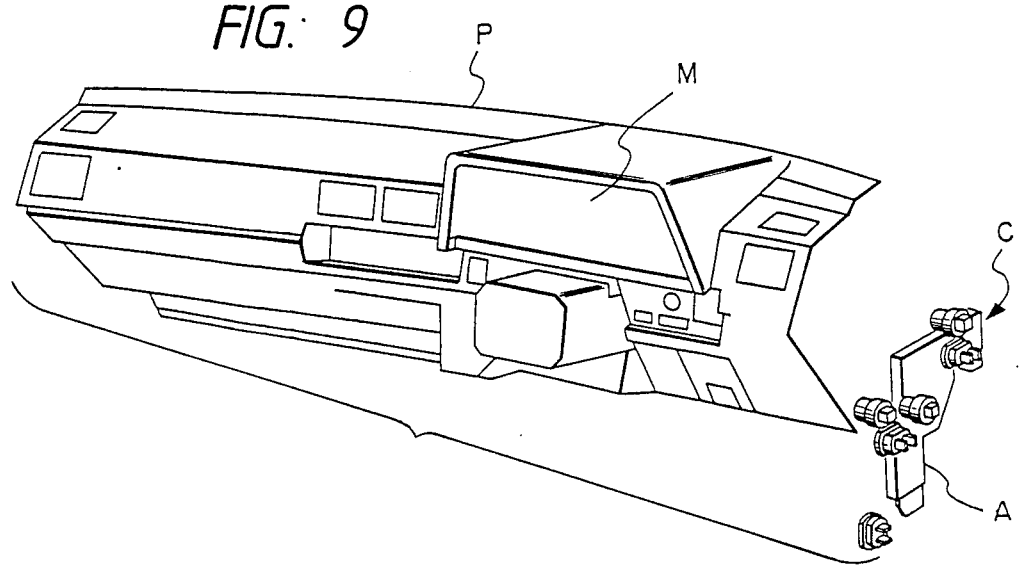
FIG. 9 is a view for explaining the assembled state of the conventional electrical connection box.

FIG. 3 is an exploded perspective view of electrical connection box B. Connection block 22 is constituted by a wiring board assembly 28, an insulating support plate 29 for insulating and supporting the wiring board assembly 28, and a main cover 30. The wiring board assembly 28 is provided with an insulating plate 27, a plurality of bus bars 26 formed on the insulating plate 27, and tab terminals 25. As shown in FIG. 2, necessary fuses 31 relays 32, a circuit breaker 33, a connector housing 34 for harness connection, a unit connection portion 35 for formation of optional circuits, and the like, are provided on the main cover 30 as in conventional electrical connection boxes. Female/male relaying terminals 36 are interposed for connection between the fuses 31, etc., and the tab terminals 25, if necessary.

The other connection blocks 23 and 24 have the same structure as that of connection block 22 and are assembled independently of each other.

The electrical connection between the connection blocks is performed by use of a plurality of conductors 37 and insulation displacing terminals 38.

Each of the terminals 38 is formed in a manner so that a slot 40 into which a conductor is to be pressed is formed at a base end portion of a male tab 39. Each terminal 38 is fixedly pressed into a corresponding press-in hole 41 formed in the insulating support plate 29 of the corresponding connection block. Male tab 39 extends to the connector housing 34 or the unit connection portion 35 through a corresponding path hole 42 in insulating plate 27. The number of terminals 38 and the positions to which the terminals 38 are attached can be changed as desired in accordance with the size and use of the respective connection blocks. The number of the slots 40 at the base end portion of the terminal 38 is not limited to one as shown in the drawing. A series of slots may be formed at predetermined intervals. Conductors 37 are pressed in and connected to the respective slots 40 of the terminals 38 which have been fixedly arranged on the back surface of the insulating support plates 29 so that the connection blocks 22-24 are connected to each other. Conductors 37, can not only be insulator-coated wires but also may be single-line wires strip members, or a so-called flat harness formed by flatly insulator-molding single-line wires, strip members, or the like.

FIGS. 4a-4d show a process of producing the electrical connection box of the present invention.

In FIG. 4a, reference numerals 43, 43 and 43" designate jig stands for holding connection blocks 22, 23 and 24 respectively. The respective jig stands are disposed at predetermined intervals and are arranged so that they may be moved vertically and diagonally by means of support poles 44 and link bars 45. Reference numeral 46 designates a conductor supply rack having grooves 47 formed at intervals for holding a plurality of conductors 37. A conductor pressing jig 48 having a conductor holding portion (not shown) which is vertically movable is provided in front of the rack 46 and just above jig stands 43, 43 and 43".

In producing an electrical connection box B, as shown in FIG. 4a, jig stands 43, 43 and 43" are arranged so that the respective surfaces thereof are at the same level. Separately-formed connection blocks 22-24 (see FIG. 3) are oriented so that slots 40 of pressure welding terminals 38 face upward. Then, as shown in FIGS. 4b and 4c, a plurality of conductors 37 each extending over the connection blocks 22-24 are collectively fixedly pressed into the respective slots 40 by pressing jig 48. Thus, connection blocks 22-24 are electrically connected to each other through the conductors 37 and the pressure welding terminals 38. Succeedingly, as shown in FIG. 4d jig stands 43' and 43 are moved relative to jig stand 43" through the operation of support poles 44 and link bar 45 along the three-dimensional structure in which they are connected through conductors 37. Then, the three-dimensional structure is covered with upper cover 20A and lower cover 20B. This completes the production of electrical connection box B having housing body 20 with connection blocks 22-24 housed therein. It is desirable to put the upper cover 20A in the state shown in FIG. 4d.

Figure 8:
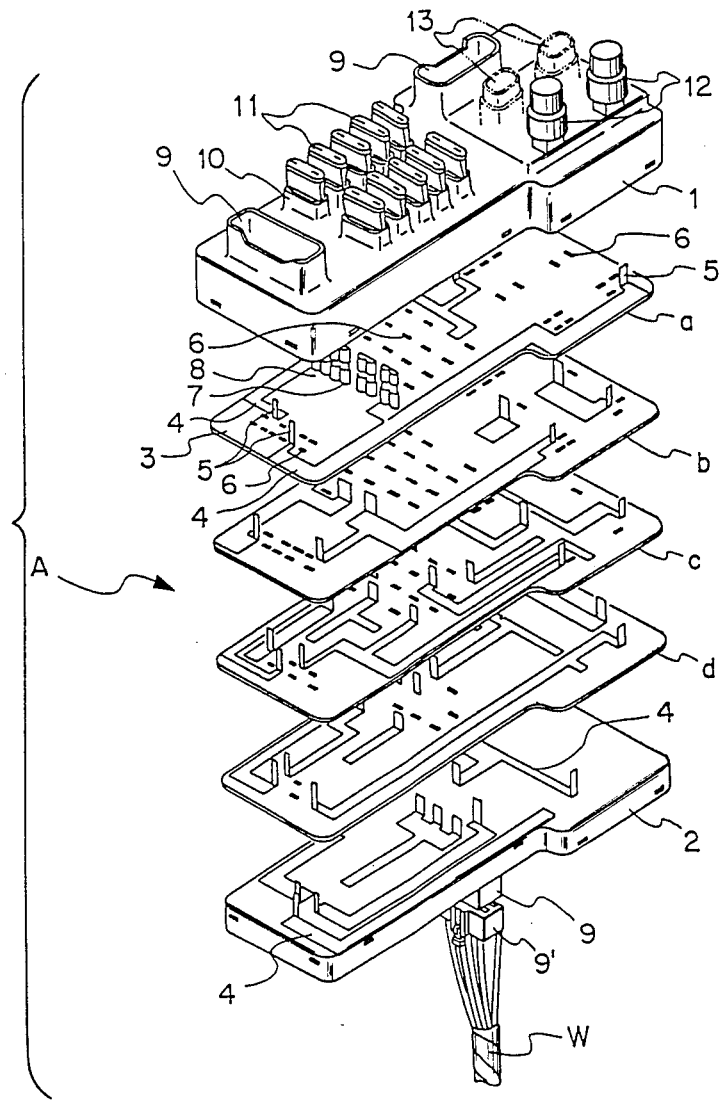
FIG. 8 is an exploded perspective view of the conventional electrical connection box.

Although the present invention has been described with the divisional connection blocks 22-24 being housed in the plastic-molding housing body 20 in the embodiment illustrated in FIGS. 1-4 the upper cover 20A or the lower cover 20B may be substituted by a portion of the wall surface of a structure such as an instrument panel so that the connection blocks are arranged and fixed on an inner or outer surface of the wall surface. Further, the number of connection blocks is not limited to three. Two or more connection blocks may be used in combination Since electrical connection box B is constituted by several connection blocks, for example, 22-24 as shown in FIG. 3, it is sufficient that each of the connection blocks house one or two sets of wiring board assemblies Accordingly, compared to the conventional multi-layer lamination structure shown in FIG. 8, it becomes easy to arrange, design and produce bus bars 26 or the like.

Since the joints of the wire harnesses can be easily accommodated by the increase in number of the conductors 37 extended over the connection blocks 22-24 and in the number of the terminals 38, it is of course possible to make the wire harness small in size as well as to prevent the wire harness from being enlarged.

Figure 6:
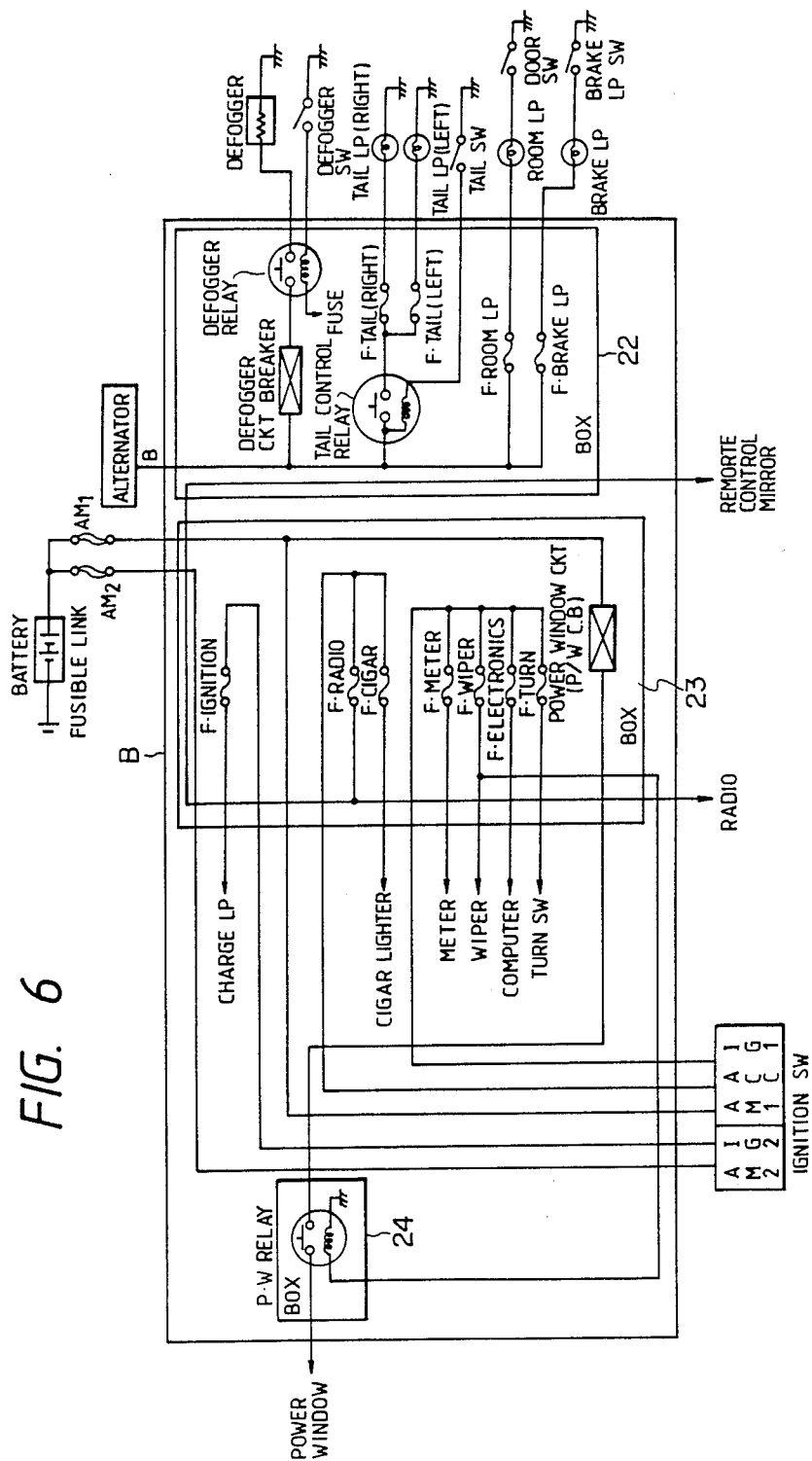
FIG. 6 is a circuit diagram showing an example of the internal structure of the electrical connection box according to the present invention.
Figure 10:
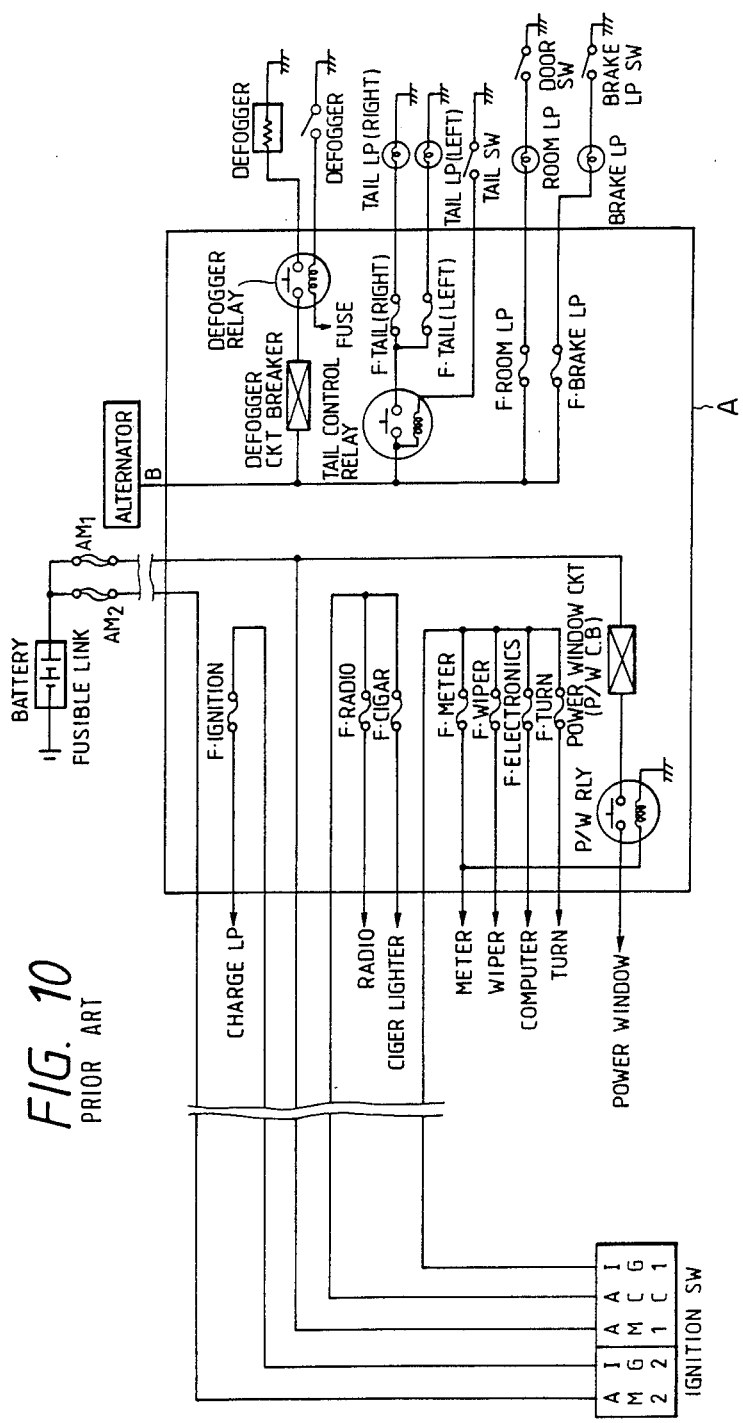
FIG. 10 is a circuit diagram showing an example of the internal structure of the conventional electrical connection box.

If one of connection blocks 22, 23 and 24 is substituted by a different connection block, another electrical connection box having a structure which is different as a whole can be formed. Thus, even if there is a change in the kind or grade of a car, or a partial change in specification, it is possible to easily conform with the change by substituting connection blocks FIG. 6 is a circuit diagram of electrical connection box B according to the present invention (as compared with that of the conventional example shown in FIG. 10). FIG. 7a is a wiring diagram of a wire harness used with electrical connection box B according to the present invention (as compared with the wiring diagram of the conventional example shown in FIG. 7b).

As will be apparent from the drawings, connection block 23, for example, is disposed at a position closely adjacent to ignition switch 14, meters 15, and so on, which are objects to be connected to the connection block 23. Accordingly, it is not necessary to make the sub-harnesses Ws of the connection circuits run between the connection block 23 and the cowl side C as in the conventional case. It is also not necessary to provide sub-harnesses Ws and panel-side harness Wp side-by-side.

Thus, since the connection blocks are disposed at the optimum positions by forming the electrical connection box using divisional portions and by properly using the wall surface of a structure such as the instrument panel of a car, it is possible to reduce the length as well as the size of the wire harness; and it is possible to simplify the configuration.

Further, since the electrical connection box or the connection blocks thereof can be arranged along the wall surface of an instrument panel or the like, space can be effectively used, so that the space in which the conventional electrical connection box is attached can be used for the arrangement of other electrical equipment.

Thus, the structure of the internal circuits in the connection blocks can be made simple, and the process of electrical connection between the connection box through the conductors and the pressure welding terminals can be automated easily, resulting in reduction in cost for producing the electrical connection box.

As described above, since the electrical connection box according to the present invention is large in capacity for accommodating joints, fuses, relays, and the like, and the divisional connection blocks can be disposed at optimum positions, the wire harness can be reduced in length as well as in size, and the configuration thereof can be simplified.

Since the electrical connection box is constituted by several connection blocks, the circuit configuration can be simplified to thereby make it easy to automate the production process. Further, by combining the connection blocks or by partially changing the connection blocks, it is possible to produce electrical connection boxes corresponding to the kind or grade of various cars.

What is claimed is:

1. An electrical connection box for positioning along a wall surface of a vehicle dashboard, said connection box comprising:
    a plurality of connection blocks each having a first surface;
    a plurality of conductors traversing said first surfaces of said connection blocks and electrically connecting said connection blocks to one another, with said connection blocks being movable with respect to one another and positioned along said wall surface of said vehicle dashboard; and
    a single housing which encases said connection blocks at least on the side of said connection blocks furthest from said wall surface.

2. An electrical connection box as claimed in claim 1, wherein said housing fixes said connection blocks with respect to one another.

3. An electrical connection box as claimed in claim 1, wherein said vehicle dashboard is in a car.

4. An electrical connection box as claimed in claim 1, wherein said housing also encloses said connection blocks on the side of said connection blocks adjacent said wall surface.

5. An electrical connection box as claimed in claim 1, further comprising terminals provided on said first surfaces of said connection blocks in which said conductors are press-fitted 6. An electrical connection box as claimed in claim 1, wherein each of said connection blocks is located at a position which is close to equipment to which said connection block is connected.

7. An electrical connection box as claimed in claim 1, wherein said first surfaces are disposed in different planes 8. An electrical connection box as claimed in claim 7, wherein said different planes are not parallel to one another.

9. An electrical connection box for positioning along a wall surface of a vehicle dashboard, said connection box comprising:
    a plurality of connection blocks each having a first surface;
    a plurality of conductors traversing said first surfaces of said connection blocks and electrically connecting said connection blocks to one another, wherein said first surfaces are disposed indifferent planes and said different planes are not parallel to one another, and further wherein said plurality of connection blocks are positioned with respect to one another to substantially conform to said wall surface of said vehicle dashboard; and
    a single housing which encases said connection blocks at least on the side of said connection blocks furthest from said wall surface.

10. An electrical connection box, comprising:
    a plurality of connection blocks each having a first surface; and
    a plurality of conductors traversing said first surfaces of said connection blocks for electrically connecting said connection blocks to one another, wherein said connection blocks are movable with respect to one another and are positioned along a wall surface of an instrument panel, and further comprising a housing which encases said connection blocks at least on the side of said connection blocks furthest from said wall surface wherein said housing fixes said connection blocks with respect to one another.

* * * * *